United States Patent
Bauer et al.

(10) Patent No.: US 7,873,505 B2
(45) Date of Patent: Jan. 18, 2011

(54) METHOD AND APPARATUS FOR PREDICTING SCHEDULED SYSTEM DOWNTIME

(75) Inventors: Eric Jonathan Bauer, Freehold, NJ (US); Douglas A. Kimber, Batavia, IL (US); Xuemei Zhang, Morganville, NJ (US); Paul Hampton Franklin, Colts Neck, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 11/168,662

(22) Filed: Jun. 27, 2005

(65) Prior Publication Data
US 2007/0010983 A1 Jan. 11, 2007

(51) Int. Cl.
*G06G 7/62* (2006.01)
(52) U.S. Cl. .................................................. 703/17
(58) Field of Classification Search .................. 703/17, 703/2, 6; 709/223
See application file for complete search history.

(56) References Cited

U.S. PATENT DOCUMENTS 7,024,580 B2 * 4/2006 Guimbellot et al. ............ 714/1
7,158,926 B2 * 1/2007 Kampe ........................ 703/22
2003/0187967 A1 * 10/2003 Walsh et al. ................ 709/223

OTHER PUBLICATIONS

Waeyenbergh et al.; Maintenance concept development: A case study; International Journal of Production Economics vol. 89, Issue 3, Jun. 18, 2004, pp. 395-405.*
Waeyenbergh et al.; A framework for maintenance concept development; Int. J. Production Economics 77 (2002), pp. 299-313.*

* cited by examiner

*Primary Examiner*—Hugh Jones
(74) *Attorney, Agent, or Firm*—Wall & Tong, LLP

(57) ABSTRACT

The invention includes a method for predicting a scheduled downtime associated with a system. In one embodiment, a method includes determining a system model associated with the system according to a system type of the system, determining at least one scheduled system downtime event type associated with the system using the system model, selecting at least one scheduled system downtime event model according to the at least one scheduled system downtime event type, and predicting the scheduled system downtime using the at least one scheduled system downtime event model.

21 Claims, 5 Drawing Sheets

METHOD AND APPARATUS FOR PREDICTING SCHEDULED SYSTEM DOWNTIME

FIELD OF THE INVENTION

The invention relates to the field of communication networks and, more specifically, to predicting scheduled downtime.

BACKGROUND OF THE INVENTION

In general, service providers have only placed system availability requirements on equipment providers for unscheduled system downtime. Recently, however, reliability expectations of service providers are shifting in a manner that places requirements on equipment providers to manage all system downtime (i.e., unscheduled system downtime as well as scheduled system downtime) rather than focusing solely on guaranteeing unscheduled system downtime. Furthermore, service providers continuously request improvements in total system availability (e.g., requiring 99.999% system availability, i.e., 5.25 minutes of total system downtime per year). While unscheduled system downtime models currently exist, unfortunately, corresponding scheduled system downtime models do not currently exist.

SUMMARY OF THE INVENTION

Various deficiencies in the prior art are addressed through the invention of a method and apparatus for predicting a scheduled downtime associated with a system. A method according to one embodiment of the present invention includes determining a system model associated with the system according to a system type of the system, determining at least one scheduled system downtime event type associated with the system using the system model, selecting at least one scheduled system downtime event model according to the at least one scheduled system downtime event type, and predicting the scheduled system downtime using the at least one scheduled system downtime event model. In one embodiment, a scheduled system downtime event type comprises at least one of a system-level event, a hardware component event, a firmware component event, a software component event, and like events.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention is discussed in the context of a communications network architecture of telecommunications services systems and associated telecommunications operations support systems; however, the methodologies of the present invention can readily be applied to various other systems (e.g., power network control systems, manufacturing control systems, and the like). The present invention enables system providers to improve modeling, prediction, and management of scheduled system downtime. The present invention enables prediction of scheduled system downtime using system models, system component models, scheduled system downtime event models, downtime metrics information, and like models and information. In one embodiment, the scheduled system downtime models of the present invention are operable for use in conjunction with unscheduled system downtime models for predicting and managing product reliability with respect to total system availability requirements.

Figure 1:
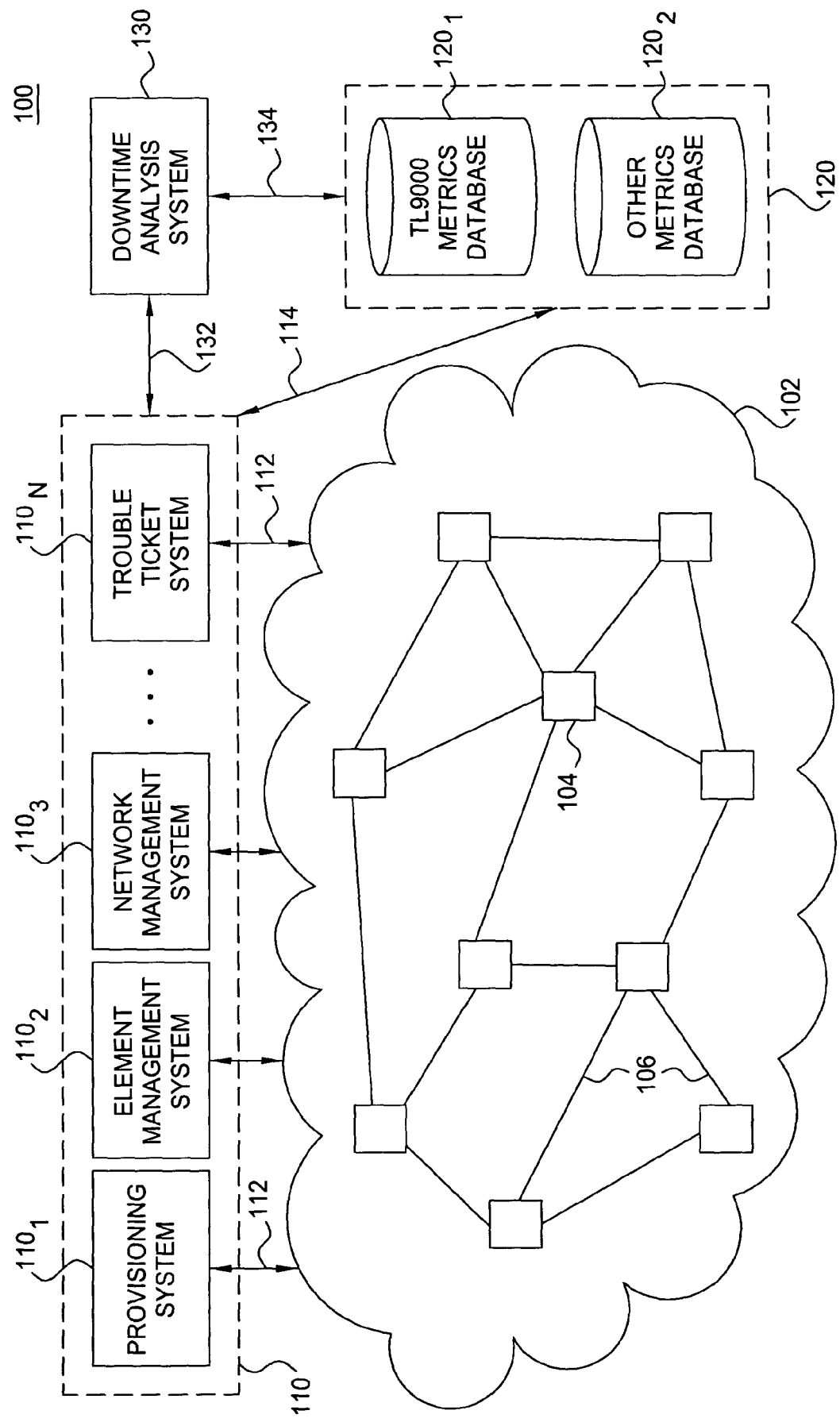
FIG. 1 depicts a high-level block diagram of a communications network architecture.

FIG. 1 depicts a high-level block diagram of a communications network architecture. Specifically, communications network architecture 100 of FIG. 1 comprises a network 102, a plurality of operations support systems (OSSs) $110_1$-$110_N$ (collectively, OSSs 110), a plurality of metrics databases (MDs) $120_1$-$120_2$ (collectively, MDs 120), and a downtime analysis system (DAS) 130. As depicted in FIG. 1, network 102 comprises a plurality of network elements (NEs) 104 (collectively, NEs 104) in communication using a plurality of communication links (CLs) 106 (collectively, CLs 106). The network 102 comprises any communications network (e.g., a publicly switched telephone network (PSTN), an asynchronous transfer mode (ATM) network, an Internet Protocol (IP) network, and like communications networks). As such, NEs 104 and associated CLs 106 comprise network elements and communications links, respectively, for transporting communications traffic, for supporting communications network services, and for performing like functions.

As depicted in FIG. 1, OSSs 110 include a provisioning system (PS) $110_1$, an element management system (EMS) $110_2$, a network management system (NMS) $110_3$, and a trouble ticket system (TTS) $110_N$. The OSSs 110 communicate with network 102 using a respective plurality of communication links (CLs) 112 (collectively, CLs 112) for maintaining network infrastructure, provisioning customer circuits, monitoring network event notifications, and performing like management functions. As depicted in FIG. 1, the MDs 120 include a TL9000 metrics database (TMD) $120_1$ and an other metrics database (OMD) $120_2$. The OSSs 110 communicate with MDs 120 using a communication link (CL) 114 for populating metrics databases with metrics information, retrieving metrics information from metrics databases, and performing like functions.

As depicted in FIG. 1, DAS 130 comprises a system operable for performing scheduled system downtime modeling, prediction, and management functions. As such, DAS 130 performs at least a portion of the methodologies of the present invention. In one embodiment, DAS 130 comprises system models, system component models, scheduled system downtime event models, and like models for performing scheduled system downtime analysis and predictions. The DAS 130 communicates with at least a portion of OSSs 110 using a communication link (CL) 132 for obtaining system downtime metrics information. Similarly, DAS 130 communicates with at least a portion of MDs 120 using a communication link (CL) 134 for obtaining system downtime metrics information.

Although depicted as comprising specific numbers of networks 102, NEs 104, CLs 106, OSSs 110, CLs 112, CLs 114, MDs 120, DASs 130, CLs 132, and CLs 134, those skilled in the art will appreciate that fewer or more networks 102, NEs 104, CLs 106, OSSs 110, CLs 112, CLs 114, MDs 120, DASs 130, CLs 132, and CLs 134 may be used. Similarly, networks 102, NEs 104, CLs 106, OSSs 110, CLs 112, CLs 114, MDs 120, DASs 130, CLs 132, and CLs 134 may be deployed in various other configurations. Furthermore, other networks, network element systems, operations support systems, metrics databases, and the like, as well as associated communications links, may be utilized in support of the methodologies of the present invention.

Figure 2:
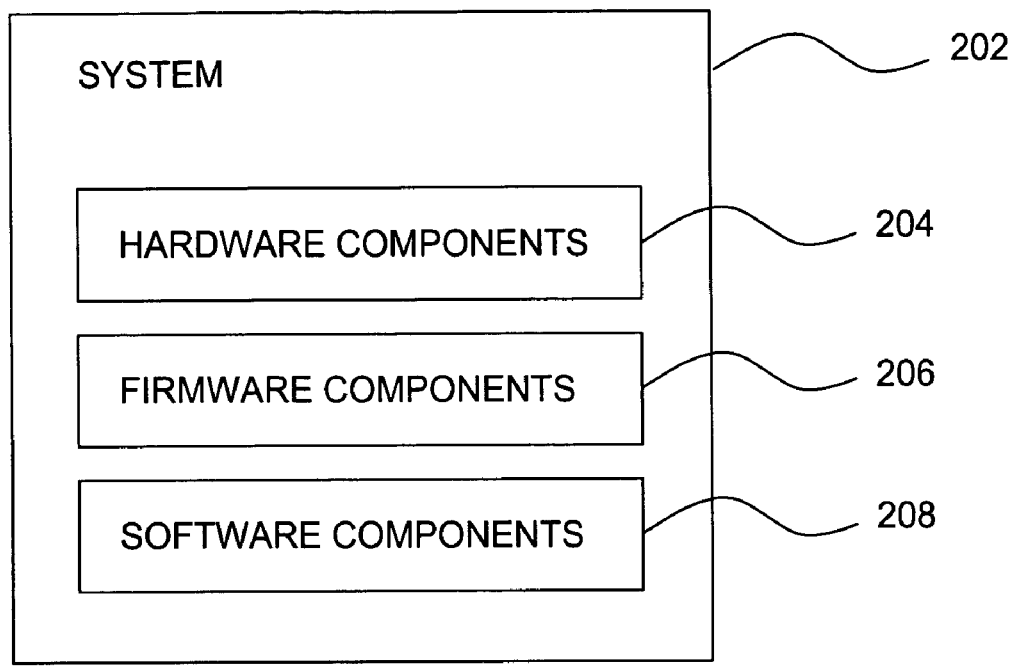
FIG. 2 depicts a high-level block diagram of a system architecture including high-level system components.

FIG. 2 depicts a high-level block diagram of a system architecture including high-level system components. Specifically, system architecture 200 of FIG. 2 comprises a system 202. The system 202 includes a hardware components portion 204, a firmware components portion 206, and a software components portion 208. In one embodiment, system 202 of FIG. 2 may comprise a logical representation of a network element (illustratively, one of the NEs 104), a network control system (illustratively, one of the OSSs 110), and like systems as known in the art. Those skilled in the art will appreciate that the hardware components portion 204, firmware components portion 206, and software component portion 208, as well as the interfaces and interaction between such component portions, varies across systems.

For example, hardware, firmware, and software components required for implementing a network management system (illustratively, NMS 110₃) may differ from hardware, firmware, and software components required for implementing a trouble ticket system (illustratively, TTS 110_N). Similarly, the hardware, firmware, and software components required for implementing an operations support system (illustratively, OSSs 110) may differ from the hardware, firmware, and software components required for implementing network elements operable for transporting network traffic (illustratively, NEs 104). Furthermore, hardware, firmware, and software components required for implementing network elements associated with different communications technologies may vary with the communications technologies (e.g., hardware, firmware, and software of an IP router differs from hardware, firmware, and software of an ATM switch).

In general, total system availability, a measure of system reliability, is determined according to system downtime, where system downtime is caused by system downtime events associated with hardware components, firmware components, software components, and the like, as well as combinations of such components and interactions between such components. In general, total system downtime comprises a combination of unscheduled system downtime and scheduled system downtime. In one embodiment, unscheduled system downtime is caused by unscheduled system downtime events and scheduled system downtime is caused by scheduled system downtime events.

In such systems, generally independent of system design, scheduled system downtime events comprise scheduled hardware downtime events (i.e., hardware repairs, updates, upgrades, and the like), scheduled firmware downtime events (i.e., firmware patches, updates, upgrades, and the like), scheduled software downtime events (i.e., software patches, updates, upgrades, releases, and the like), scheduled system-level downtime events (e.g., system restarts (i.e., periodic, outage recovery, and the like), routine maintenance (i.e., procedural errors while completing routine maintenance), non-supplier-attributable events and the like), and like scheduled downtime events.

In one embodiment, at least a portion of such scheduled system downtime events comprise scheduled events (i.e., system component outages not associated with system component events (e.g., periodic system restarts)). In another embodiment, at least a portion of such scheduled system downtime events comprise deferred recovery events (i.e., system component downtime scheduled in response to system component events such as hardware failures, memory leaks, and the like in order to recover from such system component problems). In one embodiment, deferred recovery events are performed in response to system outages that do not count towards system unavailability metrics (e.g., less than 10% of system capacity is impacted by the system component event).

In one embodiment, scheduled system downtime (and, optionally, scheduled system availability metrics) is defined in terms of Quality Excellence for Suppliers of Telecommunications Leadership (QUEST) TL9000 requirements. In one such embodiment, scheduled system downtime information used for estimating scheduled system downtime for at least a portion of a system comprises TL9000 metrics data (e.g., Corrective Patch Quality (CPQ), One-Year Return Rate (YRR), and like parameters). In one embodiment, when determining if system downtime counts towards system availability, TL9000 requires the downtime to be service impacting to at least 10% of the system functionality (e.g., customers capable of being served by that system).

In one embodiment, system downtime computations are pro-rated proportionally according to the percentage of system functionality impacted by an outage (e.g., a hardware outage, a firmware outage, a software outage, and the like). For example, if a switching system comprises twenty line cards and each card is capable of carrying 5% of the communications traffic for that system, and one of the twenty line cards is down for thirty minutes (e.g., for a line card upgrade), there is no associated system downtime. For example, if a switching system comprises twenty line cards and each card is capable of carrying 5% of the communications traffic for that system, and two of the twenty line cards are down for thirty minutes (e.g., for respective line card upgrades), the associated system downtime is three minutes.

Figure 3:
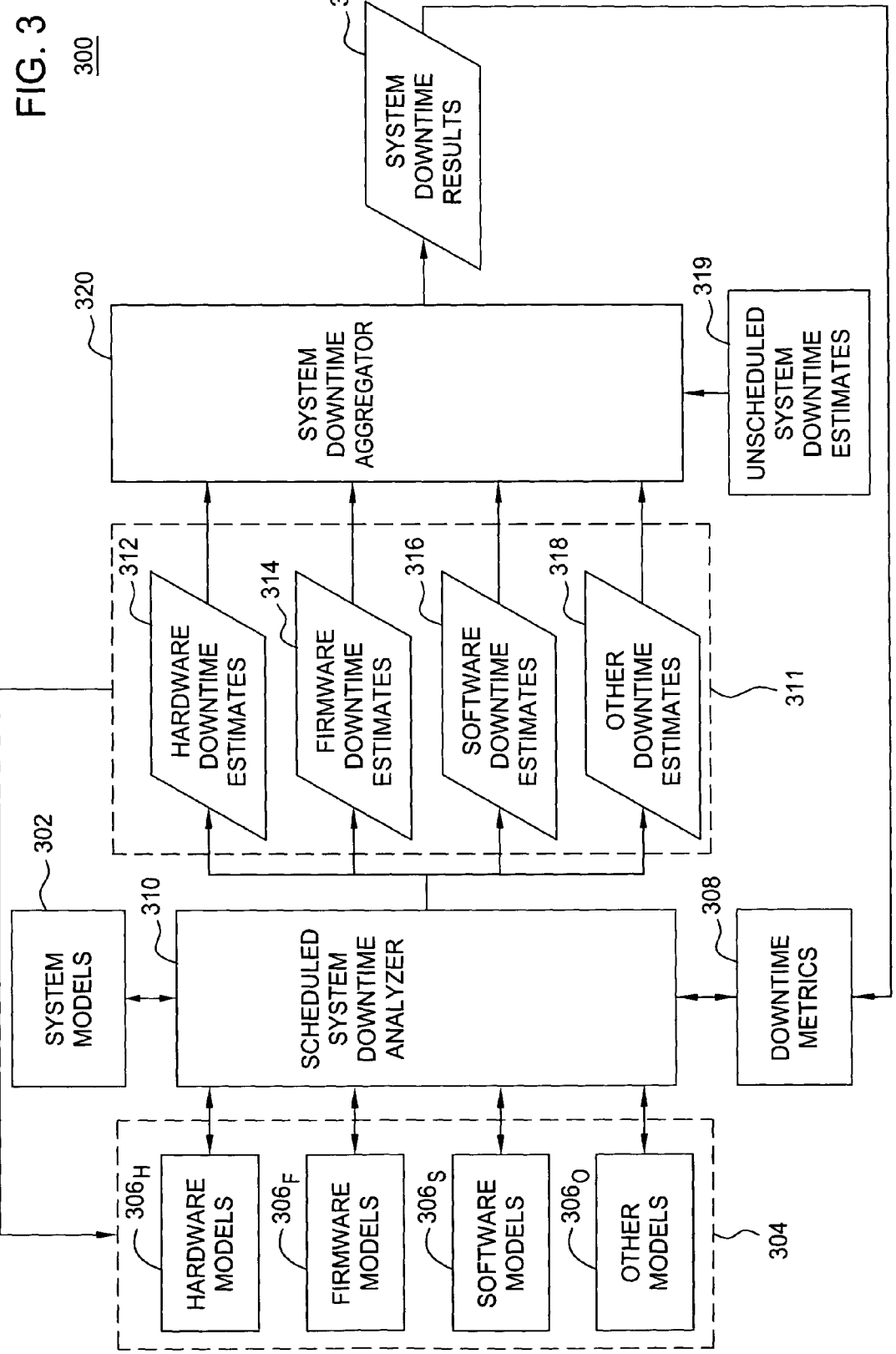
FIG. 3 depicts a logical representation of a software architecture according to one embodiment of the invention.

FIG. 3 depicts a logical representation of a software architecture according to one embodiment of the invention. The software architecture 300 of FIG. 3 comprises a scheduled system downtime analyzer (SSDA) 310 and a system downtime aggregator (SDA) 320. In one embodiment, software architecture 300 of FIG. 3 is implemented as a portion of DAS 130 depicted and described with respect to FIG. 1. In one such embodiment, DAS 130 comprises memory components for storing software programs associated with the software architecture components of FIG. 3, and processors for executing such programs, as well as other control programs and associated circuitry operable for use in implementing and controlling various portions of the present invention.

As depicted in FIG. 3, SSDA 310 utilizes system models (SM) 302, models 304 (e.g., component models, downtime event models, and like models), and downtime metrics (DM) 308 to produce downtime estimates (DEs) 311. The models 304 comprise hardware models (HM) 306_H, firmware models (FM) 306_F, software models (SM) 306_S, and other models (OM) 306_O. The DEs 311 comprise hardware downtime estimates (HDE) 312, firmware downtime estimates (FDE) 314, software downtime estimates (SDE) 316, and other downtime estimates (ODE) 318. As depicted in FIG. 3, SDA 320 utilizes HDE 312, FDE 314, SDE 316, ODE 318, and, optionally, unscheduled system downtime estimates (USDE) 319 for producing system downtime results (SDR) 322. As depicted in FIG. 3, at least a portion of SDR 322 is used to supplement DM 308.

The SM 302 comprises at least one system model. In one embodiment, SM 302 comprises system models defined according to system type. For example, SM 302 may comprise at least one system model for systems operable for transporting network traffic (illustratively, NEs 104), at least one system model for systems operable for supporting traffic-carrying systems (illustratively, OSSs 110), and like system models. In one further embodiment, SM 302 comprises system models defined according to communications technology. For example, SM 302 may comprise a system model for IP network elements, a system model for ATM network elements, and the like system models defined according to communications technology.

In one embodiment, a system model comprises hardware component types, firmware component types, and software component types associated with a particular system type. In one further embodiment, a system model comprises configuration of such component types, interaction between such component types, and like information associated with a particular system type. In one embodiment, SSDA 310 uses system model information obtained from SM 302 for selecting information (e.g., component models, scheduled system downtime event models, downtime metrics information, and the like) from at least one of HM $306_H$, FM $306_F$, SM $306_S$, OM $306_O$, and DM 308.

In one embodiment, HM $306_H$ comprises at least one hardware component model. In one embodiment, at least a portion of the hardware component models vary according to hardware type. In one embodiment, at least a portion of the hardware component models vary according to system type (e.g., a traffic-carrying system, an OSS, and the like). In one further embodiment, at least a portion of the hardware component models vary according to communications technology (e.g., a model for a DS1 line card, a model for an Ethernet switch backplane component, and the like).

In one embodiment, HM $306_H$ comprises at least one hardware component downtime event model. In one embodiment, selection of a hardware component downtime event model is performed using a hardware component model. In one embodiment, at least a portion of the hardware component downtime event models vary according to system type, communications technologies and the like. In one embodiment, HM $306_H$ comprises at least one hardware component downtime event model for a hardware repair event, at least one hardware component downtime event model for a hardware update event, and at least one hardware component downtime event model for a hardware upgrade event. In general, planned hardware outages are significantly shorter than unplanned hardware outages and, in one embodiment, are modeled as such.

In one embodiment, a hardware component downtime event model for a hardware repair event is used for estimating scheduled system downtime associated with hardware repair events. In one embodiment, a scheduled hardware repair event is performed in response to a hardware outage impacting less than a threshold of system capacity. A service provider may opt to postpone recovery actions for partial hardware outages to off hours in order to minimize overall service impact. For example, if one port on a line card fails, a service provider may schedule the line card replacement during off-peak hours in order to minimize the impact on other customers served by still-operational portions of the partially-failed line card.

For example, in an embodiment in which service providers measure total system availability and system downtime according to TL9000 metrics, service providers are likely to postpone hardware component replacements affecting less than 10% of system capacity. In one such embodiment, in which service providers measure total system availability according to TL9000 metrics, the hardware component downtime associated with hardware component repair events affecting greater than 10% of system capacity are pro-rated according to the percentage of system capacity lost during the hardware repair event.

In one embodiment, a hardware component downtime event model for a hardware update event is used for estimating scheduled system downtime associated with hardware update events. In one embodiment, a hardware update event comprises updating at least a portion of a hardware component. For example a hardware component update may be performed to fix a defect in an existing design (e.g., completing a class A/AC hardware change). In one embodiment, a hardware component downtime event model for a hardware update event is defined according to general availability (GA) of the system. For example, a pre-GA hardware update event model may predict that no hardware updates are required (i.e., scheduled system downtime equals zero), while a post-GA hardware update event model may predict a certain frequency of required hardware component updates.

In one embodiment, a hardware component downtime event model for a hardware upgrade event is used for estimating scheduled system downtime associated with hardware upgrade events. In general, hardware upgrade events are performed for adding capacity, features, functionality, and the like that was not supported in the previous version of the hardware component. In one embodiment, service ability engineering information may be used for estimating scheduled system downtime durations for specific hardware component upgrades.

In one embodiment, a hardware component downtime event model is selected according to a system model, wherein the system model is determined according to a system type associated with the system. As such, selecting a hardware component downtime event model by identifying a similar system type, a similar hardware component, and a similar event type, enables accurate prediction of a scheduled hardware component downtime portion of a scheduled system downtime for hardware repair events, hardware update events, hardware upgrade events, and like hardware events.

In one embodiment, FM $306_F$ comprises at least one firmware component model. In one embodiment, at least a portion of the firmware component models vary according to firmware type. In one embodiment, at least a portion of the firmware component models vary according to system type (e.g., a traffic-carrying system, an OSS, and the like). In one further embodiment, at least a portion of the firmware component models vary according to communications technology (e.g., firmware associated with an IP router, firmware associated with an ATM switch, and the like). In one embodiment, FM $306_F$ comprises at least one firmware component downtime event model. In one embodiment, selection of a firmware component downtime event model is performed using a firmware component model. In one embodiment, at least a portion of the firmware component downtime event models vary according to system type, communications technology, and the like. In one embodiment, FM $306_F$ comprises at least one firmware component downtime event model for a firmware patch/repair/update event and at least one firmware component downtime event model for a firmware upgrade event.

In one embodiment, a firmware component downtime event model for a firmware repair/update/patch event is used for estimating scheduled system downtime associated with firmware repair/patch/update events. In general, a firmware repair/patch/update is performed on a firmware component such as a Field-Programmable Gate Array (FPGA) and like programmable devices to fix one or more identified defects. In one embodiment, at least a portion of the firmware component downtime event models are defined according to hardware component downtime event models associated with hardware components with which the firmware components interact.

In one embodiment, a scheduled firmware repair/patch/update event is performed in response to a firmware outage impacting less than a threshold (e.g., less than 10% for TL9000) of system capacity. In general, scheduled firmware outages are significantly shorter than unscheduled firmware outages and, in one embodiment, are modeled as such. In general, service providers may opt to postpone recovery actions for partial firmware outages to off hours in order to minimize overall service impact. For example, if an FPGA fails, a service provider may schedule the firmware repair/patch/update during off hours in order to minimize the impact on other customers served by still-operational portions of the system including the defective firmware.

In one embodiment, in which service providers measure total system availability according to TL9000 metrics, service providers are likely to postpone firmware repair/patch/update events affecting less than 10% of system capacity. In one embodiment, in which a service provider measures total system availability according to TL9000 metrics, the firmware component downtime for firmware repair/patch/update events affecting greater than 10% of system functionality are pro-rated according to the percentage of system capacity lost during the firmware repair/patch/update event.

In one embodiment, a firmware component downtime event model for a firmware repair/patch/update event is defined according to the maturity of the system (e.g., whether the system has entered general availability (GA)). For example, a pre-GA firmware repair/patch/update event model may predict that no firmware repairs/patches/updates are required (i.e., scheduled system downtime associated with firmware repairs/patches/updates equals zero). In one embodiment, a post-GA firmware repair/patch/update event model predicts a certain frequency of firmware component patches/updates. In one further embodiment, as class A/AC firmware changes are identified, scheduled system downtime associated with specific firmware component changes is continuously refined.

In one embodiment, a firmware component downtime event model for a firmware upgrade event is used for estimating scheduled system downtime associated with firmware upgrade events. In general, firmware upgrade events are performed for adding features, functionality, and the like not supported in the previous version of the firmware component. In one embodiment, hardware upgrade event information (e.g., component models, component downtime event models, and the like) may be used for estimating scheduled system downtime durations for upgrades of firmware components.

In one embodiment, a firmware component downtime event model is selected according to a system model, wherein the system model is determined according a system type associated with the system. As such, selecting a firmware component downtime event model by identifying a similar system type, a similar firmware component, and a similar event type, enables the present invention to accurately predict a scheduled firmware component downtime portion of a scheduled system downtime for firmware patch events, firmware update events, firmware upgrade events, and like firmware events. The selection of firmware component models, firmware component downtime event models, and like models is performed by SSDA 310.

In one embodiment, SM 306$_S$ comprises at least one software component model. In one embodiment, at least a portion of the software component models vary according to system type (e.g., a traffic-carrying system, an OSS, and the like). In one embodiment, at least a portion of the software component models vary according to communications technology (e.g., firmware associated with an IP router, firmware associated with an ATM switch, and the like). In one embodiment, SM 306$_S$ comprises at least one software component downtime event model. In one embodiment, at least a portion of the software component downtime event models vary according to system type, component type, communications technology, and the like.

In one embodiment, SM 306$_S$ comprises at least one software component downtime event model for a software patch event, at least one software component downtime event model for a software update event, at least one software component downtime event model for a software upgrade event, and at least one software component downtime event model for a software release event. In one embodiment, scheduled software component downtime is computed as a sum of application patch downtime, platform patch downtime, application update/upgrade/release downtime, and platform update/upgrade/release downtime. In general, scheduled software outages are significantly shorter than unscheduled software outages and, in one embodiment, are modeled as such.

In one embodiment, application patch downtime comprises downtime for both successful and unsuccessful software patches. In one embodiment, platform patch downtime comprises downtime for both successful and unsuccessful patching of operating system and associated platform elements. In one embodiment, for example, software component patch downtime is estimated as a sum of successful patch downtime (e.g., patch rate×successful patch downtime×patch success probability) and unsuccessful patch downtime (e.g., patch rate×failed patch downtime×(1−(patch success probability))).

For example, assuming a patch rate of two patches per year, a patch success probability of 99%, a successful patch downtime of approximately 12 minutes, and a failed patch downtime of approximately 60 minutes, the estimated software component patch downtime is approximately 25 minutes per year. In one embodiment, patch success probability is determined using applicable TL9000 metrics such as CPQ0 (i.e., defective corrective patches for release N), CPQ0 (i.e., defective corrective patches for release N−1), FPQ0 (i.e., defective feature patches for release N), MIP0 (i.e., defective manual intervention patches for release N), and like TL9000 metrics.

In one embodiment, application upgrade/update/release downtime comprises downtime for successful and unsuccessful software (i.e., application) upgrades, updates, and releases per year. In one embodiment, platform upgrade/update/release downtime comprises downtime for upgrading, updating, and retrofitting operating systems, databases, other platform software elements, and the like. In one embodiment, at least a portion of the software component downtime event models are defined based on an assumption that updates of operating systems, databases, and other platform software elements occur less frequently than patching, updating, and upgrading of application software. It should be noted that the distinction between application and platform may not be applicable to network elements utilizing integrated application/platform software (e.g., such as various real-time based systems).

In one embodiment, software component upgrade downtime comprises a sum of successful upgrade downtime (update rate×successful update downtime×update success probability) and unsuccessful upgrade downtime (an update rate× failed update downtime×(1−(update success probability)). In one embodiment, software upgrade success probability is determined using applicable TL9000 metrics such as SWU0 (i.e., defective software updates for release N), SWU1 (i.e., defective software updates for release N−1), SWU2 (i.e., defective software updates for release N−2), and like TL9000 metrics. For example, assuming an upgrade rate of 2 software upgrades per year, a software upgrade success probability of 99%, a successful upgrade downtime of 15 minutes, and a failed upgrade downtime of 90 minutes, the estimated software component upgrade downtime is 31.5 minutes/year.

In one embodiment, a software component downtime event model is selected according to a system model, wherein the system model is determined according a system type associated with the system. As such, selecting a software component downtime event model by identifying a similar system type, a similar software component, and a similar event type, enables accurate prediction of a scheduled software component downtime portion of a scheduled system downtime for software patch events, software update events, software upgrade events, and software release events. As depicted in FIG. 3, selection of software component models, software component downtime event models, and like models is performed by SSDA 310.

In one embodiment, OM 306$_O$ comprises at least one other component model, at least one model associated with interaction between various system components, and the like. In one embodiment, other component models vary according to at least one of system type, communications technology, and the like. In one embodiment, OM 306$_O$ comprises at least one other component downtime event model. In one embodiment, at least a portion of the other component downtime event models varies according to at least one of system type, communications technology, and the like. In one embodiment, OM 306$_O$ comprises at least one other component downtime event model for at least one of a system restart event, a routine maintenance event, a non-supplier-attributable event, and like events.

In one embodiment, a system restart event comprises a periodic software restart performed in response to (or for prevention of) residual defects in memory or resource management, data/state inconsistencies, and like residual defects. In one embodiment, a system restart event comprises restarting a portion of a system (e.g., restarting blade software). In one embodiment, scheduled system downtime resulting from a system restart event is computed using an average number of system restarts and average restart downtime. In one embodiment, an average number of restarts in a given time period and the average restart downtime and are modeled according to at least one of system-type, software component type, technology, and like factors. In one embodiment, at least one other component downtime event model for a system restart event assumes that a probability of needing a scheduled system restart is highest in immature products and decreases as software matures across releases and residual defects are removed from the system.

In one embodiment, a routine maintenance event comprises system maintenance activities, such as replacing system air filters. Although many equipment provider products are designed for non-service affecting routine maintenance, procedural errors during routine maintenance may affect service in certain circumstances. In one embodiment, at least one other component downtime event model for a routine maintenance event is computed using a routine maintenance rate, a routine maintenance error probability (e.g., probability of error resulting in a failure affecting greater than 10% of system capacity), and an average service restoration time.

In one embodiment, scheduled system downtime resulting from procedural errors during routine system maintenance is classified as service-provider-attributable (i.e., non-supplier-attributable). In one embodiment, such service-provider-attributable system downtime is not included in scheduled system downtime models and associated predictions. For example, if a service provider opts to restart a system or portion of a system as part of a periodic restart unrelated to performance-impacting events, any system component outages resulting from such service provider activity may be classified as service-provider-attributable.

In one embodiment, another component downtime event model is selected according to a system model, wherein the system model is determined according a system type associated with the system. As such, selecting another component downtime event model by identifying a similar system type, a similar component, and a similar event type, enables the present invention to accurately predict a scheduled other component downtime portion of a scheduled system downtime for system restart events, routine maintenance events, and like events. As depicted in FIG. 3, selection of various other component models, component downtime event models, and like models is performed by SSDA 310.

It should be noted that the nature of scheduled system downtime is likely to shift for a system over the lifetime of the system. For example, scheduled outage recovery actions and periodic reboots may dominate early system releases (e.g., clearing memory and resource leaks, correcting data integrity issues, and the like), and software updates, upgrades, and new releases may dominate mature system releases. In one embodiment, such shifts in the primary sources of scheduled system downtime may be accounted for using a system evolution model. In one, such embodiment, a system evolution model may be used in conjunction with various system models, system component models, system downtime event models, and like models for improving the accuracy scheduled system downtime predictions.

In one embodiment, as hardware component, firmware component, software component, and other component repairs, updates, upgrades, releases and like scheduled downtime events are identified over the life of a system, the corresponding hardware component downtime event models, firmware component downtime event models, software component downtime event models, and other downtime event models for respective events are continuously refined. In one such embodiment, at least one scheduled system downtime event model is modified using at least one of the DEs 311, the scheduled system downtime, the SDRs 322, and the like.

In one embodiment, SDR 322 is sent to DM 308 for use by SSDA 310 in determining at least a portion of the DEs 311. In one embodiment, at least a portion of the DEs 311 are sent to models 304 for modifying (e.g., refining) the models 304. In one embodiment, refinement of the models 304 includes performing a weighted average using a previous downtime prediction (e.g., a previous value from the DEs 311, SDR 322, and like estimates) and actual downtime estimates based on field experience. For example, once a first system outage occurs in the field, the original downtime prediction may be averaged with the actual downtime measured in the field using a weighting for the original downtime estimate (e.g., ⅔ weighting) and a weighting for the measured field data (e.g., a ⅓ weighting).

As described herein, in one embodiment, at least a portion of the scheduled system downtime modeling components (e.g., assumptions, required information, equations, metrics data processing, and the like associated with HM $306_H$, FM $306_F$, SM $306_S$, and OM $306_O$ vary across systems. For example, implementation of scheduled system downtime modeling components for estimating scheduled system downtime of a radio network controller (RNC) may vary from implementation of scheduled system downtime modeling components for estimating scheduled system downtime of an Ethernet switch. Similarly, the types of downtime metrics, quantities of downtime metrics, processing of downtime metrics, and the like required for estimating scheduled system downtime associated with various system components (e.g., hardware components, firmware components, software components, other components, and the like) vary across systems.

In one embodiment, DM 308 comprises estimated downtime metrics. In one embodiment, DM 308 comprises actual downtime metrics. In one embodiment, DM 308 comprises TL9000 metrics. In one embodiment, SSDA 310 performs probabilistic processing on at least a portion of metrics obtained from DM 308. For example, in one embodiment, SSDA 310 may compute an average hardware component downtime for scheduled hardware component outages. In another embodiment, for example, SSDA 310 may compute a standard deviation of a software component upgrade downtime using downtimes associated with software upgrade outages for similar software components in similar systems. In one embodiment, DM 308 comprises metrics obtained from operation support systems (illustratively, OSSs 120) in communication with a system for which scheduled system downtime is estimated (e.g., system downtime information obtained from TTS $110_3$ associated with NEs 104).

As depicted in FIG. 3, SSDA 310 outputs HDE 312, FDE 314, SDE 316, and ODE 318. In one embodiment, HDE 312 comprises a hardware downtime estimate including hardware repair downtime, hardware update downtime, hardware upgrade downtime, and like hardware-related downtime. In one embodiment, FDE 314 comprises a firmware downtime estimate including firmware patch downtime, firmware update downtime, firmware upgrade downtime, and like firmware-related downtime. In one embodiment, SDE 316 comprises a software downtime estimate including software patch downtime, software update downtime, software upgrade downtime, software release downtime, and like software-related downtime. In one embodiment, ODE 318 comprises various other downtime estimates such as software restart downtime, maintenance downtime, and, optionally, non-supplier-attributable downtime. The SDA 320 aggregates HDE 312, FDE 314, SDE 316, and ODE 318, and, optionally USDE 319, to produce SDR 322. In one embodiment, SDR 322 is stored as a portion of DM 308.

Figure 4:
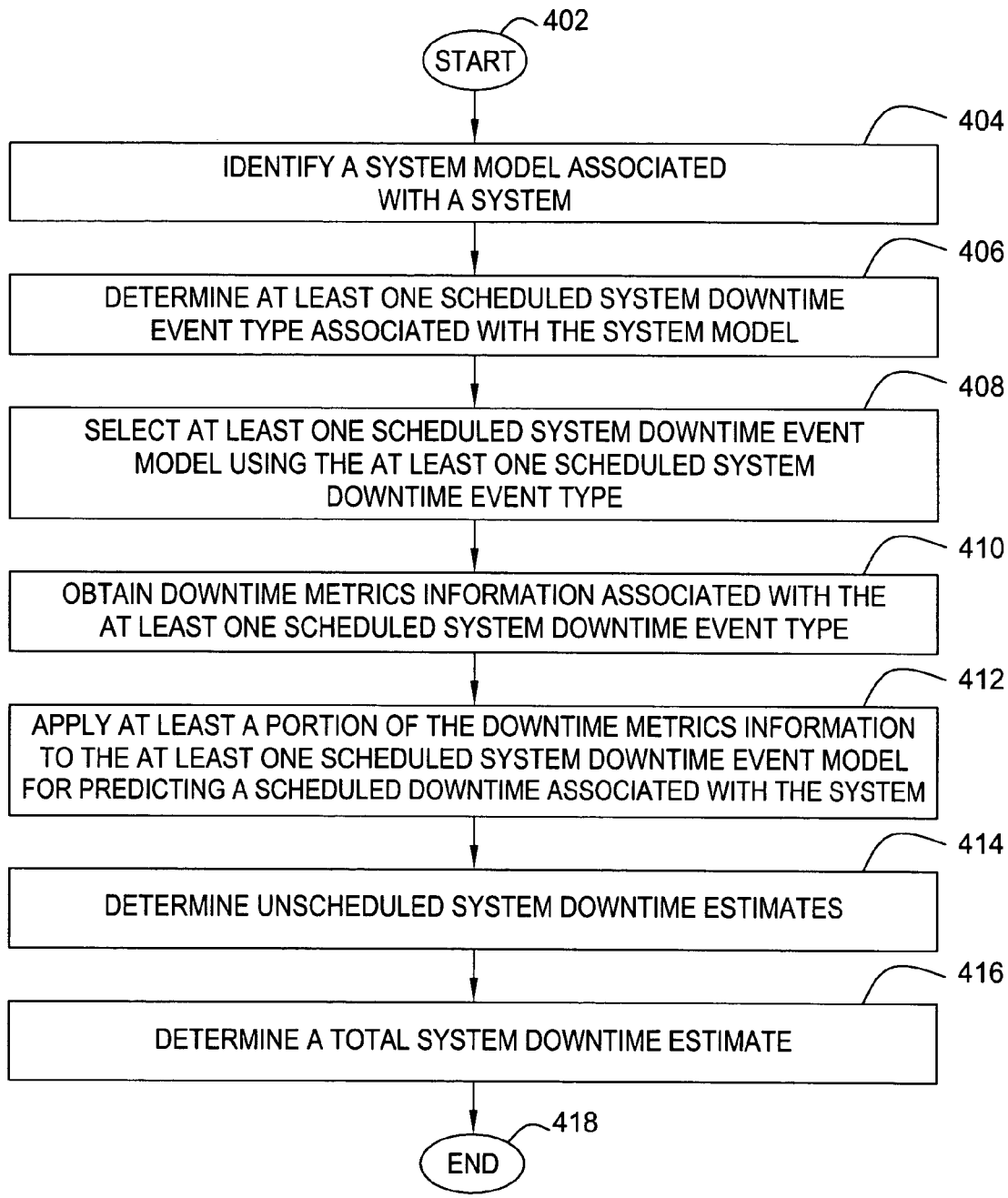
FIG. 4 depicts a flow diagram of a method according to one embodiment of the invention.

FIG. 4 depicts a core diagram of a method according to one embodiment of the invention. Specifically, method 400 of FIG. 4 comprises a method for determining a scheduled system downtime associated with at least a portion of a system. Although the steps are depicted as being performed serially, those skilled in the art will appreciate that at least a portion of the steps of method 400 may be performed contemporaneously, as well as in a different order than presented in FIG. 4. The method 400 is entered at step 402 and proceeds to step 404.

At step 404, a system model associated with a system is identified. At step 406, at least one scheduled system downtime event type associated with a system model is determined. At step 408, at least one scheduled system downtime event model is selected. In one embodiment, the at least one scheduled system downtime event model selected using the at least one scheduled system downtime event type. At step 410, downtime metrics information associated with the at least one scheduled system downtime event type is obtained. At step 412, at least a portion of the downtime metrics information is applied to the at least one scheduled system downtime event model for determining scheduled system downtime associated with the system. At step 414, unscheduled system downtime estimates are determined. At step 416, a total system downtime estimate is determined. The method 400 then proceeds to step 418, where method 400 ends.

In one embodiment, at least a portion of the methodologies of the present invention are implemented as a portion of a software tool for predicting and managing system downtime/unavailability, as a portion of a system reliability prediction service, and the like. In one further embodiment, scheduled system downtime predictions according to the present invention are used in conjunction with unscheduled system downtime events for modeling, predicting, and managing total system availability. In one such embodiment, unscheduled system downtime comprises unscheduled hardware downtime, unscheduled firmware downtime, unscheduled software downtime, other unscheduled downtime, and various combinations of the like.

Although primarily described herein with respect to telecommunications systems, the present invention may be used for modeling and predicting scheduled system downtime in other systems (e.g., power network control systems, manufacturing control systems, and various other systems comprising different combinations of hardware, firmware, software, and related components). Furthermore, it is contemplated that at least a portion of the described functions may be combined into fewer functional elements. Similarly, it is contemplated that various functions may be performed by other functional elements, or that the various functions may be distributed across the various functional elements in a different manner.

Figure 5:
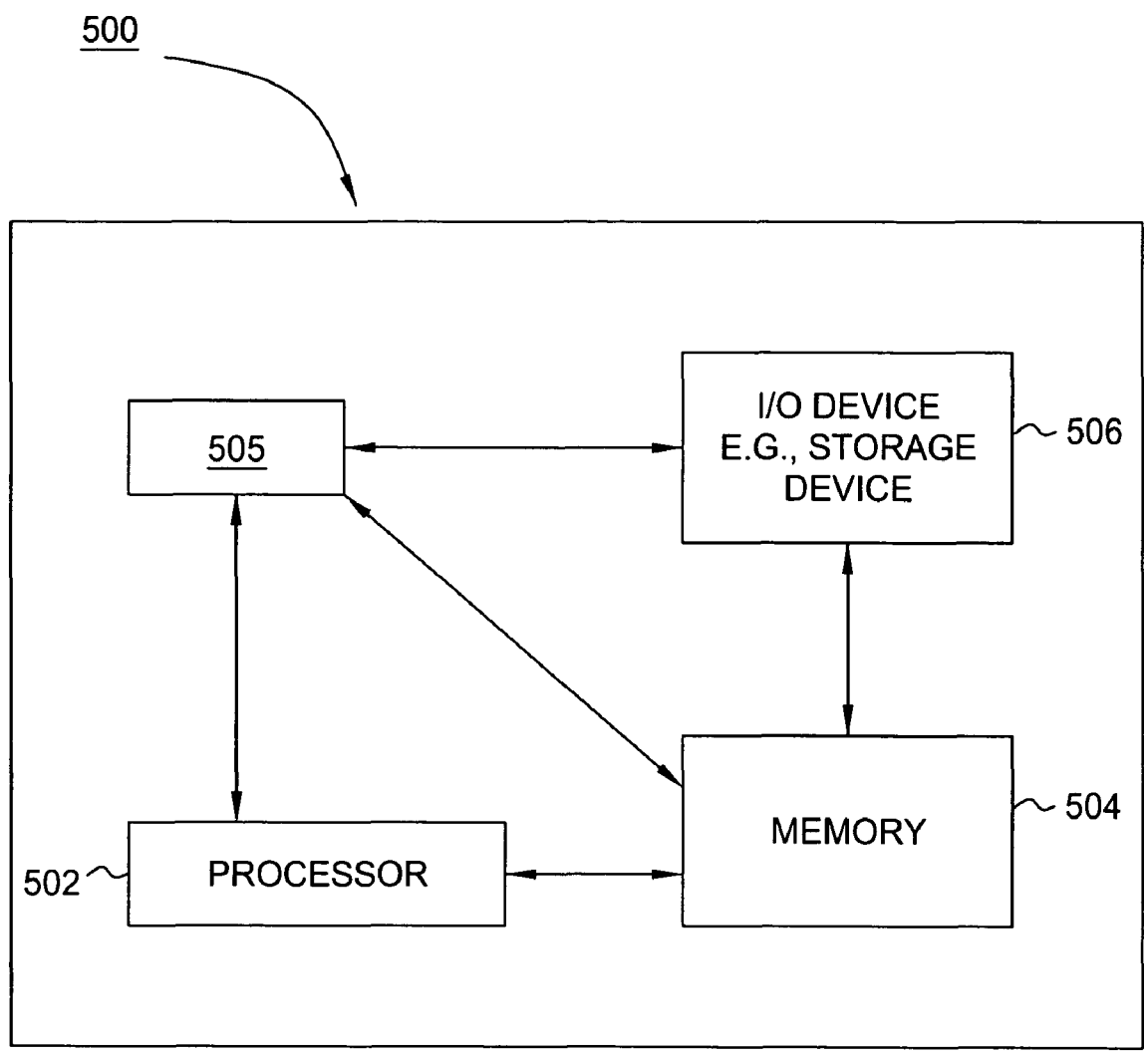
FIG. 5 depicts a high-level block diagram of a general purpose computer suitable for use in performing the functions described herein.

FIG. 5 depicts a high-level block diagram of a general purpose computer suitable for use in performing the functions described herein. As depicted in FIG. 5, system 500 comprises a processor element 502 (e.g., a CPU), a memory 504, e.g., random access memory (RAM) and/or read only memory (ROM), a scheduled system downtime analysis module 505, and various input/output devices 506 (e.g., storage devices, including but not limited to, a floppy drive, a hard disk drive or a compact disk drive, a receiver, a transmitter, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present scheduled system downtime analysis module or process 505 can be loaded into memory 504 and executed by processor 502 to implement the functions as discussed above. As such, scheduled system downtime analysis process 505 (including associated data structures) of the present invention can be stored on a computer readable medium or carrier, e.g., RAM memory, magnetic or optical drive or diskette and the like.

Although various embodiments which incorporate the teachings of the present invention have been shown and described in detail herein, those skilled in the art can readily devise many other varied embodiments that still incorporate these teachings.

What is claimed is:

1. An apparatus for predicting scheduled downtime for a system, the apparatus comprising:
   a processor;
   a scheduled system downtime analyzer configured for determining a plurality of scheduled system downtime estimates comprising first and second scheduled system downtime estimates for the system;
      wherein the first and second scheduled system downtime estimates are determined using at least one scheduled system downtime event model and downtime metrics;
      wherein the first and second scheduled system downtime estimates each comprise at least one of a hardware downtime estimate determined using a hardware model, a firmware downtime estimate determined using a firmware model, and a software downtime estimate determined using a software model;
      wherein at least one of the scheduled system downtime event models used for determining at least one of the first and second scheduled system downtime estimates is configured for determining a scheduled system downtime estimate using pro-rating based at least in part on a percentage of system capacity expected to be affected by an associated event for which the scheduled system downtime estimate is determined; and
   a system downtime aggregator configured for aggregating the scheduled system downtime estimates to produce thereby scheduled system downtime results for the system, and for updating at least one scheduled system downtime event model using at least a portion of the scheduled system downtime results.

2. The apparatus of claim 1, wherein the downtime metrics used for determining the scheduled system downtime estimates comprise at least one of actual downtime metrics and estimated downtime metrics.

3. The apparatus of claim 1, wherein the downtime metrics comprise estimated downtime metrics.

4. The apparatus of claim 3, wherein the system downtime aggregator is configured for updating at least a portion of the estimated downtime metrics using at least a portion of the scheduled system downtime results.

5. The apparatus of claim 1, wherein at least one of the scheduled system downtime estimates is determined using a system model.

6. The apparatus of claim 5, wherein the system model comprises at least one of a hardware component type associated with a system type, a firmware component type associated with a system type, and a software component type associated with a system type.

7. The apparatus of claim 1, wherein the scheduled system downtime analyzer is configured for identifying a system model associated with the system, determining at least one scheduled system downtime event type associated with the system model, and selecting at least one of the scheduled system downtime event models using the at least one scheduled system downtime event type.

8. A method for predicting scheduled downtime for a system, the method comprising:
   using a processor for:
   determining a plurality of scheduled system downtime estimates comprising first and second scheduled system downtime estimates for the system;
      wherein the first and second scheduled system downtime estimates are determined using at least one scheduled system downtime event model and downtime metrics;
      wherein the first and second scheduled system downtime estimates each comprise at least one of a hardware downtime estimate determined using a hardware model, a firmware downtime estimate determined using a firmware model, and a software downtime estimate determined using a software model;
      wherein at least one of the scheduled system downtime event models used for determining at least one of the first and second scheduled system downtime estimates is configured for determining a scheduled system downtime estimate using pro-rating based at least in part on a percentage of system capacity expected to be affected by an associated event for which the scheduled system downtime estimate is determined;
   aggregating the scheduled system downtime estimates for the system to produce thereby scheduled system downtime results for the system; and
   updating at least one scheduled system downtime event model using at least a portion of the scheduled system downtime results.

9. The method of claim 8, wherein the downtime metrics used for determining the scheduled system downtime estimates comprise at least one of actual downtime metrics and estimated downtime metrics.

10. The method of claim 8, wherein the downtime metrics comprise estimated downtime metrics.

11. The method of claim 10, further comprising:
   updating at least a portion of the estimated downtime metrics using at least a portion of the scheduled system downtime results.

12. The method of claim 8, wherein at least one of the scheduled system downtime estimates is determined using a system model.

13. The method of claim 12, wherein the system model comprises at least one of a hardware component type associated with a system type, a firmware component type associated with a system type, and a software component type associated with a system type.

14. The method of claim 8, further comprising:
   identifying a system model associated with the system;
   determining at least one scheduled system downtime event type associated with the system model; and
   selecting at least one of the scheduled system downtime event models using the at least one scheduled system downtime event type.

15. A non-transitory computer readable storage medium storing instructions which, when executed by a computer, causes the computer to perform a method for predicting scheduled downtime for a system, the method comprising:
   determining a plurality of scheduled system downtime estimates comprising first and second scheduled system downtime estimates for the system;
      wherein the first and second scheduled system downtime estimates are determined using at least one scheduled system downtime event model and downtime metrics;
      wherein the first and second scheduled system downtime estimates each comprise at least one of a hardware downtime estimate determined using a hardware model, a firmware downtime estimate determined using a firmware model, and a software downtime estimate determined using a software model;

wherein at least one of the scheduled system downtime event models used for determining at least one of the first and second scheduled system downtime estimates is configured for determining a scheduled system downtime estimate using pro-rating based at least in part on a percentage of system capacity expected to be affected by an associated event for which the scheduled system downtime estimate is determined;

aggregating the scheduled system downtime estimates for the system to produce thereby scheduled system downtime results for the system; and updating at least one scheduled system downtime event model using at least a portion of the scheduled system downtime results.

16. The non-transitory computer readable storage medium of claim 15, wherein the downtime metrics used for determining the scheduled system downtime estimates comprise at least one of actual downtime metrics and estimated downtime metrics.

17. The non-transitory computer readable storage medium of claim 15, wherein the downtime metrics comprise estimated downtime metrics.

18. The non-transitory computer readable storage medium of claim 17, the method further comprising:

updating at least a portion of the estimated downtime metrics using at least a portion of the scheduled system downtime results.

19. The non-transitory computer readable storage medium of claim 15, wherein at least one of the scheduled system downtime estimates is determined using a system model.

20. The non-transitory computer readable storage medium of claim 19, wherein the system model comprises at least one of a hardware component type associated with a system type, a firmware component type associated with a system type, and a software component type associated with a system type.

21. The non-transitory computer readable storage medium of claim 15, the method further comprising:

identifying a system model associated with the system;

determining at least one scheduled system downtime event type associated with the system model; and selecting at least one of the scheduled system downtime event models using the at least one scheduled system downtime event type.

* * * * *